US010207228B2

(12) United States Patent
Lee et al.

(10) Patent No.: US 10,207,228 B2
(45) Date of Patent: Feb. 19, 2019

(54) SURFACE-MODIFIED SEPARATION MEMBRANE AND METHOD FOR MODIFYING SURFACE OF SEPARATION MEMBRANE

(71) Applicants: LG ELECTRONICS INC., Seoul (KR); INDUSTRY-UNIVERSITY COOPERATION FOUNDATION HANYANG UNIVERSITY, Seoul (KR)

(72) Inventors: Changho Lee, Seoul (KR); Hyowon Kim, Seoul (KR); Jeongil Kye, Seoul (KR); Hobum Park, Seoul (KR)

(73) Assignee: LG CHEM, LTD., Seoul (KR)

( * ) Notice: Subject to any disclaimer, the term of this patent is extended or adjusted under 35 U.S.C. 154(b) by 300 days.

(21) Appl. No.: 14/911,415

(22) PCT Filed: Oct. 1, 2014

(86) PCT No.: PCT/KR2014/009289
§ 371 (c)(1),
(2) Date: Feb. 10, 2016

(87) PCT Pub. No.: WO2015/050387
PCT Pub. Date: Apr. 9, 2015

(65) Prior Publication Data
US 2016/0199788 A1   Jul. 14, 2016

(30) Foreign Application Priority Data
Oct. 4, 2013   (KR) .................. 10-2013-0118753

(51) Int. Cl.
*B01D 65/08*      (2006.01)
*B01D 67/00*      (2006.01)

(52) U.S. Cl.
CPC ......... *B01D 67/0088* (2013.01); *B01D 65/08* (2013.01); *B01D 2323/02* (2013.01); *B01D 2323/30* (2013.01)

(58) Field of Classification Search
None
See application file for complete search history.

(56) References Cited

U.S. PATENT DOCUMENTS 5,670,097 A  *  9/1997  Duan ................. A61B 5/1455
                                              264/1.24
6,039,872 A  *  3/2000  Wu ................... B01D 67/0006
                                              210/500.35
(Continued)

FOREIGN PATENT DOCUMENTS

CN       101269303       9/2008
CN       102614789       8/2012
(Continued)

OTHER PUBLICATIONS

CN 103041721 Machine Translation.pdf—machine translation of CN 103041721 (via Espacenet)—Zhu Liping et al (Year: 2013).*
(Continued)

*Primary Examiner* — Krishnan S Menon
*Assistant Examiner* — Bradley R Spies
(74) *Attorney, Agent, or Firm* — Ked & Associates, LLP (57) ABSTRACT

A surface-modified separation membrane of the present invention comprises a separation membrane, and a coating layer formed on the surface of the separation membrane for improving the contamination resistance and chemical resistance of the separation membrane, wherein the coating layer is implemented with a nanoscale thickness of the coating layer in order to inhibit a decrease in permeation flux of the separation membrane before and after coating the coating layer, and comprises: dopamine for providing, to the coating layer, an adsorption force to be bound stably with the separation membrane; and a hydrophilic material which is bound to the dopamine through secondary bonding or cross-linking containing a hydrogen bond in order to inhibit the deterioration of the durability of the coating layer, and provides hydrophilicity to the surface of the separation membrane in order to protect the separation membrane from hydrophobic contaminants. A method for modifying the surface of a separation membrane of the present invention (Continued)

comprises the steps of: injecting a separation membrane to be surface-modified into a reactor; adding a mixture solution, which is formed by adding a hydrophilic material to a Tris-buffer solution having an adjusted pH range at which dopamine reacts and stirring the same, to the reactor; adding dopamine and an initiator, which induces the cross-linking of the hydrophilic material and dopamine, to the reactor at a predetermined temperature range; and forming a coating layer comprising dopamine and the hydrophilic material on the separation membrane through thermal cross-linking at the predetermined temperature range while injecting oxygen into the reactor.

8 Claims, 8 Drawing Sheets

(56) References Cited

U.S. PATENT DOCUMENTS

| | | | |
|---|---|---|---|
| 2008/0149566 A1 | 6/2008 | Messersmith et al. | |
| 2011/0207841 A1* | 8/2011 | Kosar | B01D 71/34 521/134 |
| 2012/0048805 A1 | 3/2012 | McCutcheon et al. | |
| 2012/0080378 A1 | 4/2012 | Revanur et al. | |
| 2013/0139835 A1* | 6/2013 | Karlsson | A24B 15/245 131/298 |
| 2013/0292252 A1* | 11/2013 | Linder | B01D 61/44 204/630 |
| 2014/0194573 A1* | 7/2014 | Carlson | C09D 143/00 524/853 |

FOREIGN PATENT DOCUMENTS

| | | |
|---|---|---|
| CN | 103041721 | 4/2013 |
| CN | 103272499 | 9/2013 |
| JP | 2010-261001 | 11/2010 |
| KR | 10-1310054 B1 | 9/2013 |
| KR | 10-2014-0100317 A | 8/2014 |
| WO | WO 2007/120631 | 10/2007 |
| WO | WO 2011/005258 A1 | 1/2011 |
| WO | WO 2012/158717 A2 | 11/2012 |

OTHER PUBLICATIONS

McCloskey, B. D. et al.: "Influence of polydopamine deposition conditions on pure water flux and foulant adhesion resistance of reverse osmosis, ultrafiltration, and microfiltration membranes"; Polymer; Elsevier Science Publishers B.V., GB; vol. 51, No. 15; Jul. 8, 2010; p. 3472-3485; XP027114230.

Jiang, J.H. et al.: "Surface modification of PE porous membranes based on the strong adhesion of polydopamine and covalent immobilization of heparin"; Journal of Membrane Science; Elsevier BV, NL; vol. 364, No. 1-2; Nov. 15, 2010; p. 194-202; XP027450293.

Miller, Daniel J. et al.: "Short-term adhesion and long-term biofouling testing of polydopamine and poly(ethylene glycol) surface modifications of membranes and feed spacers for biofouling control"; Water Research; Elsevier, Amsterdam, NL; vol. 46, No. 12; Mar. 24, 2012; p. 3737-3753; XP028514800.

Cho, Joon Hee: "Bioinspired Catecholic Copolymers for Antifouling Surface Coatings"; ACS Applied Materials and Interfaces; vol. 5, No. 9; Apr. 1, 2013; p. 3794-3802.

Japanese Office Action dated Jan. 31, 2017 issued in Application No. 2016-534547.

European Search Report dated Apr. 4, 2017 issued in Application No. 14850487.1.

International Search Report and Written Opinion dated Jan. 16, 2015 issued in Application No. PCT/KR2014/009289.

Chinese Office Action dated Oct. 26, 2016 issued in Application No. 201480047843.5 (English translation attached).

* cited by examiner

SURFACE-MODIFIED SEPARATION MEMBRANE AND METHOD FOR MODIFYING SURFACE OF SEPARATION MEMBRANE

CROSS-REFERENCE TO RELATED PATENT APPLICATIONS

This application is a U.S. National Stage Application under 35 U.S.C. § 371 of PCT Application No. PCT/KR2014/009289, filed Oct. 1, 2014, which claims priority to Korean Patent Application No. 10-2013-0118753, filed Oct. 4, 2013, whose entire disclosures are hereby incorporated by reference.

TECHNICAL FIELD

The present invention relates to a surface-modified membrane in which the surface of the membrane is hydrophilically modified in order to improve fouling resistance and chemical resistance of the membrane, and a method of modifying the surface of the membrane for implementing the surface-modified membrane.

BACKGROUND ART

In membranes used for water treatment, membrane fouling occurs as membranes are used for a long period of time, and there occur problems in a decrease in water permeation flow rate due to membrane fouling and safety due to a long-term operation. Moreover, these problems also cause an increase in overall operation costs of the membrane.

Accordingly, various methods are used in order to reduce membrane fouling. Examples of a representative method for reducing membrane fouling include a surface-coating method of a hydrophilic material and a chemical grafting method.

The surface-coating method of the hydrophilic material has an advantage in that the membrane has excellent fouling resistance during the initial period of operation, but has a disadvantage in that there occurs a phenomenon in which a coating layer is peeled off from the membrane during a long-period operation or when the membrane is chemically cleaned for the continuous use of the membrane.

Further, the chemical grafting method has an advantage in that the method has excellent long-period stability compared to the surface coating method of a hydrophilic material, but has a disadvantage in that reaction conditions are stringent and it is difficult to obtain a large area.

Accordingly, it may be considered to develop a technology of modifying the surface of a membrane, which may overcome the disadvantages present in the methods in the related art and improve performance of the membrane.

DISCLOSURE OF THE INVENTION

Therefore, an object of the present invention is to suggest a surface-modified membrane having a structure different from the structure in the related art and a method of modifying the surface of a membrane configured by a method different from the methods in the related art.

Another object of the present invention is to provide a technology of modifying the surface, which has excellent fouling resistance and long-term stability for various supports.

To achieve these and other advantages and in accordance with the purpose of the present invention, as embodied and broadly described herein, there is provided a surface-modified membrane according to an exemplary embodiment of the present invention, including: a membrane; and a coating layer formed on the surface of the membrane in order to improve fouling resistance and chemical resistance of the membrane, in which the coating layer includes dopamine which implements the thickness of the coating layer on the nanoscale in order to suppress the permeation flow rate of the membrane from being decreased before and after the coating layer is coated and provides the coating layer with adhesion by which the coating layer is stably bonded to the membrane, and a hydrophilic material which is bonded to the dopamine through a secondary bond including a hydrogen bond, or a cross-linked bond in order to suppress durability of the coating layer from deteriorating, and imparts hydrophilicity to the surface of the membrane in order to protect the membrane from hydrophobic fouling materials.

According to an exemplary embodiment relating to the present invention, the hydrophilic material, which is bonded to the dopamine through the cross-linked bond, is a poly ethylene glycol (PEG)-based material selected from a group consisting of poly(ethylene glycol) methyl ether acrylate (PEGMEA), poly(ethylene glycol) acrylate (PEGA), poly(ethylene glycol) dimethacrylate (PEGDMA) and tetra(ethylene glycol) dimethacrylate (TEGDM).

According to anther exemplary embodiment relating to the present invention, the hydrophilic material, which is bonded to the dopamine through the secondary bond including a hydrogen bond, is a water-soluble molecule having an amphoteric hydrogen donor or hydrogen acceptor.

According to still another exemplary embodiment of the present invention, the hydrophilic material, which is bonded to the dopamine through the secondary bond including a hydrogen bond, is a hydrophilic polymer or a catecholamine-based water-soluble material.

According to yet another exemplary embodiment of the present invention, the hydrophilic material, which is bonded to the dopamine through the secondary bond including a hydrogen bond, is a poly(2-methacryloyloxyethyl phosphorylcholine) (MPC) polymer or an amphiphilic copolymer having both hydrophAccoilicity and oleophilicity.

According to still yet another exemplary embodiment relating to the present invention, the coating layer which is implemented by the dopamine may have a thickness of 0.1 to 50 nm.

Further, in order to realize the aforementioned problems, the present invention discloses a method of modifying the surface of a membrane. The method of modifying the surface of a membrane includes: introducing a membrane of which the surface is to be modified into a reactor; adding a mixed solution formed by adding a hydrophilic material to a tris-buffer solution adjusted to a pH range in which dopamine is reacted and stirring the resulting mixture to the reactor; adding dopamine and an initiator which induces a cross-linked bond between the hydrophilic material and the dopamine to the reactor in a predetermined temperature range; and forming a coating layer in which the dopamine and the hydrophilic material are mixed on the membrane through thermal crosslinking in the predetermined temperature range while injecting oxygen into the reactor.

According to an exemplary embodiment relating to the present invention, the initiator is at least one selected from the group consisting of lauroyl peroxide, ammonium persulfate, potassium persulfate, and azobisisobutyronitrile (AIBN).

According to another exemplary embodiment relating to the present invention, the pH range in which the dopamine is reacted is pH 8 to pH 9, and the predetermined temperature range is 60 to 80° C.

According to the present invention having the configuration as described above, a coating layer may be formed on various supports by being coated with dopamine and a hydrophilic material.

Further, in the present invention, it is possible to form a coating layer on the nanoscale, which is similar to a coating layer coated with dopamine alone, and a stable coating layer may be formed by strong adsorption capability of dopamine.

In addition, in the present invention, a coating layer having fouling resistance and long-term stability may be formed on a membrane by a hydrophilic material which is cross-linked to or secondarily bonded to dopamine.

BRIEF DESCRIPTION OF THE DRAWINGS

FIGS. 7a to 9b are a comparative graph for explaining the effects of modifying the surface of the membrane.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, a surface-modified membrane and a method of modifying the surface of the membrane will be described in more detail with reference to the accompanying drawings. In the present specification, like reference numbers are used to designate like constituents even though they are in different exemplary embodiments, and the description thereof will be substituted with the initial description. Singular expressions used herein include plural expressions unless they have definitely opposite meanings in the context.

Figure 1A:
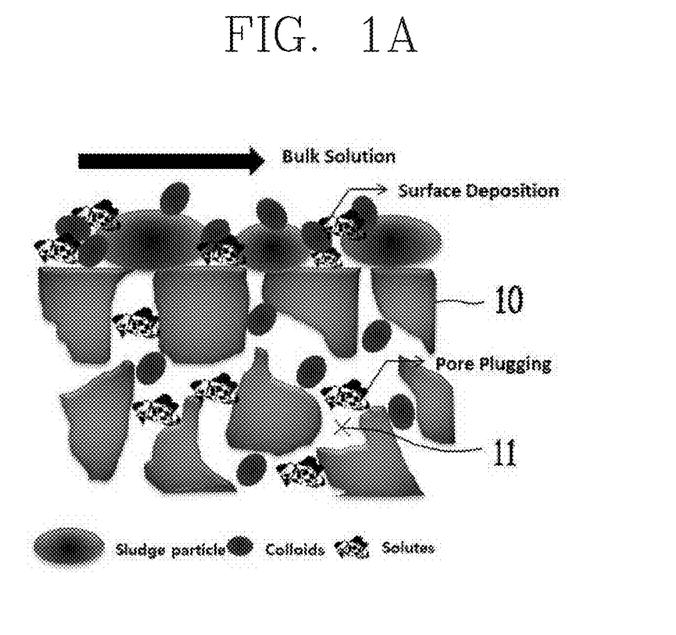
FIG. 1a is a conceptual view for explaining membrane fouling occurring in a membrane.
Figure 1B:
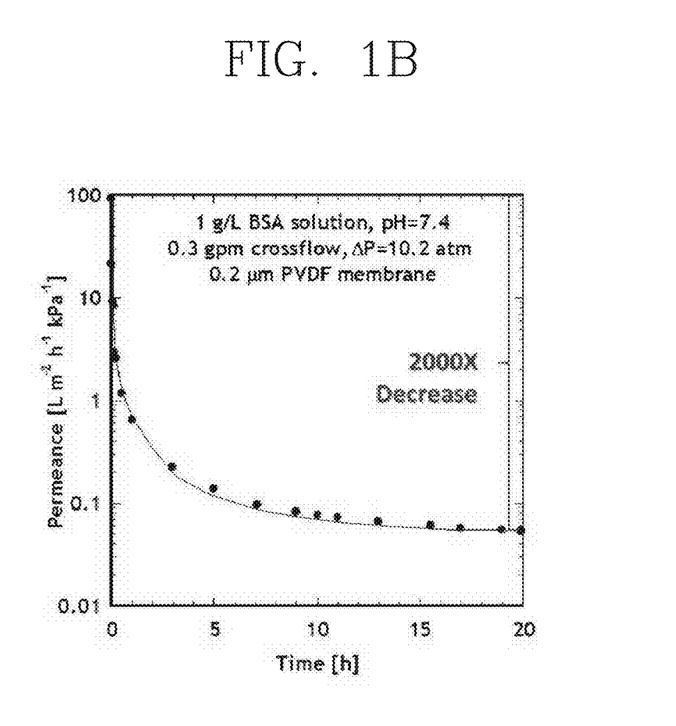
FIG. 1b is a graph for explaining a decrease in water permeation flow rate by membrane fouling as the operation time of the membrane is increased.

FIG. 1a is a conceptual view for explaining membrane fouling occurring in a membrane 10, and FIG. 1b is a graph for explaining a decrease in water permeation flow rate by membrane fouling as the operation time of the membrane is increased.

Membrane fouling refers to a phenomenon in which various fouling sources are adsorbed on the pore 11 and surface of the membrane 10.

Referring to FIG. 1a, pores 11 are formed in the membrane 10 used for water treatment, thereby filtering a solution to be subjected to water treatment (bulk solution). As the operation time of the membrane 10 passes, fouling sources are gradually adsorbed on the surface and pore 11 of the membrane 10.

Examples of the fouling sources include sludge particles having a large size and solutes having a relatively small size, colloids corresponding to an intermediate size between the sludge particles and the solutes, and the like. The sludge particles are larger than the pores 11 of the membrane 10, and thus, are adsorbed only on the surface of the membrane 10 (surface deposition), but the colloids or the solutes not only are adsorbed on the surface of the membrane 10 due to the size which is smaller than the pores 11, but also permeate into the membrane 10 through the pore 11, thereby plugging the pore 11 (pore plugging).

Membrane fouling causes a decrease in place for which a material to be subjected to water treatment may permeate the surface and pores of the membrane 10, thereby significantly decreasing the permeation flow rate, and furthermore, significantly increasing the operation time.

Referring to FIG. 1b, as the operation time for the membrane is increased, membrane fouling occurs in the membrane, so that a graph in which the permeation flow rate is gradually decreased is illustrated.

The horizontal axis of the graph indicates time, and the vertical axis of the graph indicates the amount of water permeated (performance).

The amount of water permeated at the initiation time (0 h) of operation of a poly(vinylidenedifluoride) (PVDF) membrane is defined as a reference value of 100, and in 20 hours after permeation of water is initiated when the operation time is increased, the amount of water permeated is decreased to 0.1 or less, which is about 1/2,000 level due to membrane fouling occurring in the membrane.

In order to solve the problems caused by membrane fouling occurring in the membrane as described above, a cleaning technology of removing membrane fouling from the membrane is used, and will be described with reference to FIG. 2.

Figure 2:
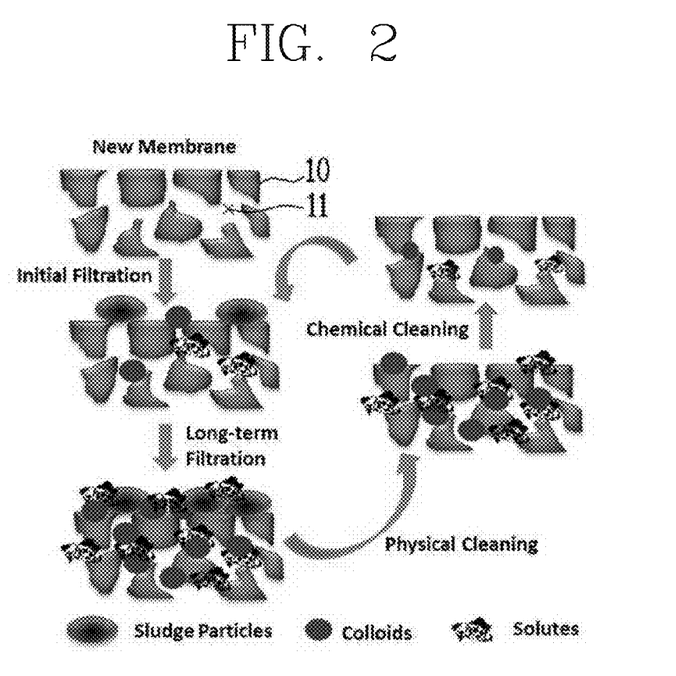
FIG. 2 is a conceptual view for explaining a technology of cleaning a fouled membrane.

FIG. 2 is a conceptual view for explaining a technology of cleaning a fouled membrane 10.

The cleaning technology of the fouled membrane 10 is divided into a physical method and a chemical method. First, the physical method is a technology of removing a contaminant source adsorbed on the surface of the membrane by using backwashing or aeration, and the like. Moreover, the chemical method is a technology of removing a fouling source adsorbed on the surface and pore 11 of the membrane 10 by using a chemical detergent in which an oxidizing agent and an acid are appropriately mixed.

Examples of the chemical method will be described with reference to the following Table 1. NaOCl is an oxidizing agent, and citric acid is an acid.

TABLE 1

|  | Type | Chemicals | Conc. (%) |
|---|---|---|---|
| Mitsubishi | CIL | NaOCl | 0.3 |
|  |  | Citric acid | 0.2 |
| Zenon | CIP | NaOCl | 0.2 |
|  |  | Citric acid | 0.2-0.3 |

TABLE 1-continued

| | Type | Chemicals | Conc. (%) |
|---|---|---|---|
| Memcor | CIP | NaOCl | 0.01 |
| | | Citric acid | 0.2 |
| Kubota | CIL | NaOCl | 0.5 |
| | | Oxalic acid | 1 |

Referring to FIG. 2, when a new membrane begins to be used, membrane fouling membranes are not adsorbed on the surface and pores 11 of the membrane 10, but membrane fouling materials begin to be adsorbed on the membrane 10 from the initial period of operation of the membrane 10 (initial filtration). Furthermore, as the operation time elapses, the amount of fouling materials adsorbed on the membrane 10 is increased, so that a large amount of membrane fouling materials are adsorbed on the surface and pores 11 of the membrane, respectively.

In the cleaning technology of removing the membrane fouling materials, a physical method and a chemical method may be used in combination with each other. First, a portion of membrane fouling materials are removed by the physical method (physical cleaning), and then subsequently, residual membrane fouling materials are removed by the chemical method (chemical cleaning). The membrane 10 subjected to cleaning may be used again for water treatment and the like because most of the membrane fouling materials are removed from the membrane 10 even though the membrane 10 is not cleaned up to the level of a new membrane 10.

The cleaning process is an essential process for using a long-term membrane 10 in the operation of the membrane 10. However, when the membrane 10 is frequently cleaned, the cleaning is economically burdensome and causes a problem in that a coating layer formed on the membrane 10 is peeled off.

The present invention has been made in an effort to overcome the aforementioned problems, and it is an object of the present invention to suggest a surface-modified membrane which may suppress membrane fouling occurring in a membrane more fundamentally and a method of modifying the surface of the membrane, and the present invention will be described with reference to the following drawings.

Figure 3:
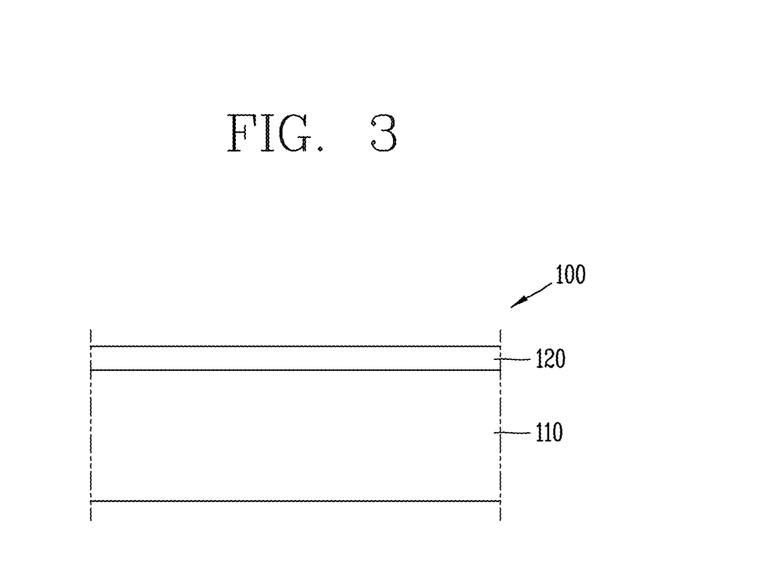
FIG. 3 is a partial cross-sectional view of a surface-modified membrane relating to an exemplary embodiment of the present invention.

FIG. 3 is a partial cross-sectional view of a surface-modified membrane 100 relating to an exemplary embodiment of the present invention.

The surface-modified membrane 100 includes a membrane 110 and a coating layer 120 formed on the surface of the membrane 110. FIG. 3 illustrates only the membrane 110 and the coating layer 120 for convenience of understanding of the present invention, but pores (not illustrated) are naturally formed for the surface-modified membrane 100 to function as a membrane.

The membrane 110 passes an object material through pores to filter the object material. The present invention is not limited in shape as long as the shape of the membrane 110 is formed in a form which may modify the surface of a flat sheet membrane, a hollow fiber membrane, and the like. The membrane 110 also serves as a support which supports the coating layer formed on the surface.

The coating layer 120 is formed on the surface of the membrane 110 so as to improve fouling resistance and chemical resistance of the membrane 110. In the present invention, the coating layer 120 formed on the surface of the membrane 110 is formed by mixing dopamine with a hydrophilic material.

Dopamine allows the thickness of the coating layer to be implemented on the nanoscale, and provides the coating layer 120 with strong adhesion.

The thickness of the coating layer is a factor which affects the permeation flow rate of the membrane 110, and the permeation flow rate is decreased as the thickness of the coating layer 120 is increased. For example, when the coating layer 120 is formed of only a poly ethylene glycol (PEG)-based hydrophilic material, there is a problem in that the permeation flow rate of the membrane 110 significantly deteriorates due to the relatively large thickness of the coating layer 120. However, dopamine, which is mixed with the hydrophilic material to form the coating layer 120, may implement the thickness of the coating layer 120 on the nanoscale, thereby suppressing the permeation flow rate of the membrane 110 from being decreased before and after the coating. The nanoscale thickness means that the thickness of the coating layer 120 is in a range of 0.1 to 50 nm. More preferably, the thickness of the coating layer 120 may be in a range of 1 to 20 nm.

When the coating layer 120 is formed of only a poly ethylene glycol (PEG)-based hydrophilic material, the type of support on which the coating layer 120 may be formed is limited and the overall durability of the membrane 110 is also limited because the coating layer 120 is not strongly adsorbed on the membrane 110. Dopamine provides the coating layer 120 with strong adhesion by which the coating layer 120 is stably bonded to the membrane 110, and allows the coating layer 120 to be formed on various types of supports, and prevents the coating layer 120 from being peeled off from the membrane 110, thereby improving the overall durability of the surface-modified membrane 100.

The hydrophilic material is boned to dopamine through a secondary bond including a hydrogen bond, or a cross-linked bond, thereby suppressing the durability of the coating layer 120 from deteriorating and imparting hydrophilicity to the surface of the membrane 110.

The cross-linked bond or the secondary bond has relatively strong bonding power, and thus, may improve durability of the coating layer 120 when a hydrophilic material is bonded to dopamine through the cross-linked bond or the secondary bond. In particular, when the surface-modified membrane 100 is operated for a long period of time, the hydrophilic material, which is strongly bonded to dopamine through the cross-linked bond or the secondary bond, physically and chemically maintains durability of the coating layer 120.

Most of the membrane fouling materials are hydrophobic materials, and thus, may protect the membrane 110 from hydrophobic fouling materials when imparting hydrophilicity to the surface of the membrane 110.

Hereinafter, examples of the hydrophilic material which may be cross-linked or secondarily bonded to dopamine will be described.

The hydrophilic material, which is bonded to the dopamine through the cross-linked bond, is a poly ethylene glycol (PEG)-based material selected from a group consisting of poly(ethylene glycol) methyl ether acrylate (PEG-MEA), poly(ethylene glycol) acrylate (PEGA), poly(ethylene glycol) dimethacrylate (PEGDMA) and tetra(ethylene glycol) dimethacrylate (TEGDM).

The molecular structures of the poly ethylene glycol materials exemplified above are represented by the following Chemical Formulae 1 to 4.

[Chemical Formula 1]

PEGMEA

[Chemical Formula 2]

PEGA

[Chemical Formula 3]

PEGDMA

[Chemical Formula 4]

TEGDM

The hydrophilic material, which is bonded to the dopamine through the secondary bond including a hydrogen bond, includes a water-soluble molecule having an amphoteric hydrogen donor or hydrogen acceptor. The water-soluble molecule having an amphoteric hydrogen donor or hydrogen acceptor is represented by the following Chemical Formulae 5 to 8. In Chemical Formulae 5 to 8, A and B are a hydrogen donor and represented by Chemical Formulae 9 and 10, respectively, and C and D are a hydrogen acceptor and represented by Chemical Formulae 11 and 12, respectively.

[Chemical Formula 5]

[Chemical Formula 6]

[Chemical Formula 7]

[Chemical Formula 8]

[Chemical Formula 9]

A =

Hydrogen Doner

[Chemical Formula 10]

B =

Hydrogen Doner

[Chemical Formula 11]

C =

Hydrogen Acceptor

[Chemical Formula 12]

D =

Hydrogen Acceptor

The hydrophilic material, which is bonded to the dopamine through the secondary bond including a hydrogen bond, includes a hydrophilic polymer or a catecholamine-based water-soluble material. The hydrophilic polymer and the catecholamine-based water-soluble material are represented by the following Chemical Formulae 13 to 19.

[Chemical Formula 13]

Poly(acrylic acid)

The hydrophilic material, which is bonded to the dopamine through the secondary bond including a hydrogen bond, includes a poly(2-methacryloyloxyethyl phosphorylcholine) (MPC) polymer or an amphiphilic copolymer having both hydrophilicity and oleophilicity. The poly(2-methacryloyloxyethyl phosphorylcholine) (MPC) polymer is represented by the following Chemical Formula 20, and the amphiphilic copolymer having both hydrophilicity and oleophilicity is represented by the following Chemical Formula 21.

-continued

Hereinafter, a method of modifying the surface of a membrane will be described.

Figure 4:
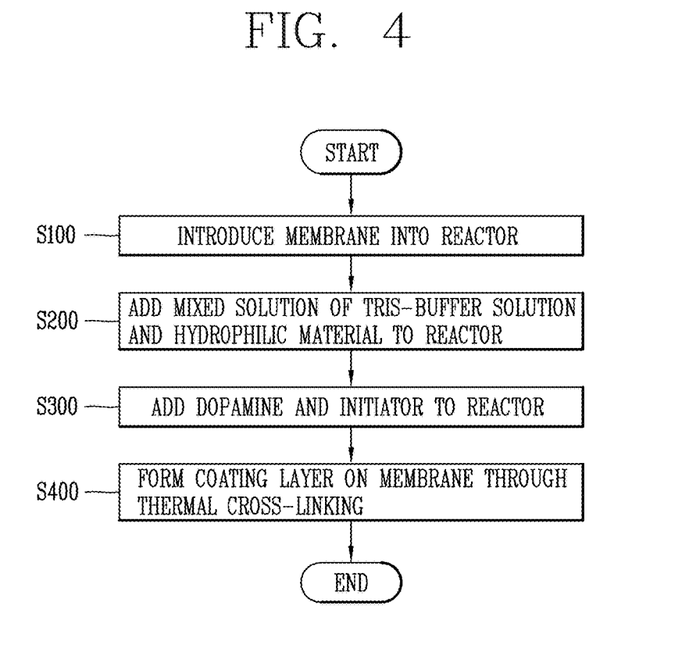
FIG. 4 a flow-chart illustrating a method of modifying the surface of the membrane relating to an exemplary embodiment of the present invention.

FIG. 4 a flow-chart illustrating a method of modifying the surface of a membrane relating to an exemplary embodiment of the present invention. However, the surface-modified membrane as described above is not necessarily formed by the method described in FIG. 4.

In order to modify the surface of a membrane, first, a membrane of which the surface is to be modified is introduced into a reactor (S100).

The membrane of which the surface is to be modified serves as a support layer which supports a coating to be formed on the surface of the membrane. In the present invention, since various supports may be used by adding dopamine, a polymer or metal and the like may be used as a material for the support. Accordingly, it is possible to overcome the material limitation of the support.

Next, a mixed solution formed by adding a hydrophilic material to a tris-buffer solution adjusted to a pH range in which dopamine is reacted and stirring the resulting mixture is added to the reactor (S200).

The tris-buffer solution adjusted to a pH range in which dopamine is reacted needs to be prepared in advance before the hydrophilic material is added to the solution, and the pH of the solution is adjusted to pH 8 to pH 9 in which dopamine is reacted by adding an acidic solution such as tris-HCl to water and additionally adding a basic solution such as NaOH thereto.

Furthermore, a mixed solution is produced by adding a hydrophilic material such as poly ethylene glycol to the tris-buffer solution with the pH adjusted and stirring the resulting mixture, and then the mixed solution is added to the reactor into which the membrane has been introduced.

Subsequently, dopamine and an initiator which induces a cross-linked bond between the hydrophilic material and the dopamine are added to the reactor in a predetermined temperature range (S300).

As the dopamine, dopamine hydrochloride (Dopa-HCl) and the like may be used. As the initiator, it is possible to use at least one selected from the group consisting of lauroyl peroxide, ammonium persulfate, potassium persulfate, and azobisisobutyronitrile (AIBN), which may induce a cross-linked bond between the hydrophilic material and the dopamine. The molecular structure of each initiator is represented by the following Chemical Formulae 22 to 25.

[Chemical Formula 22]

Lauroyl peroxide

[Chemical Formula 23]

ammonium persulfate

[Chemical Formula 24]

potassium persulfate

[Chemical Formula 25]

Azobisisobutyronitrile

Finally, a coating layer in which the dopamine and the hydrophilic material are mixed is formed on the membrane through thermal crosslinking in the predetermined temperature range while injecting oxygen into the reactor (S400).

Through thermal crosslinking, dopamine and the hydrophilic material form a cross-linked bond are bonded to each other, thereby forming a coating layer on the surface of the membrane. After the thermal crosslinking reaction is completed, it is preferred that the surface-modified membrane is additionally washed with water.

Hereinafter, the membranes before and after being surface-modified will be compared with each other with reference to FIGS. 5a and 5b.

Figure 5A:
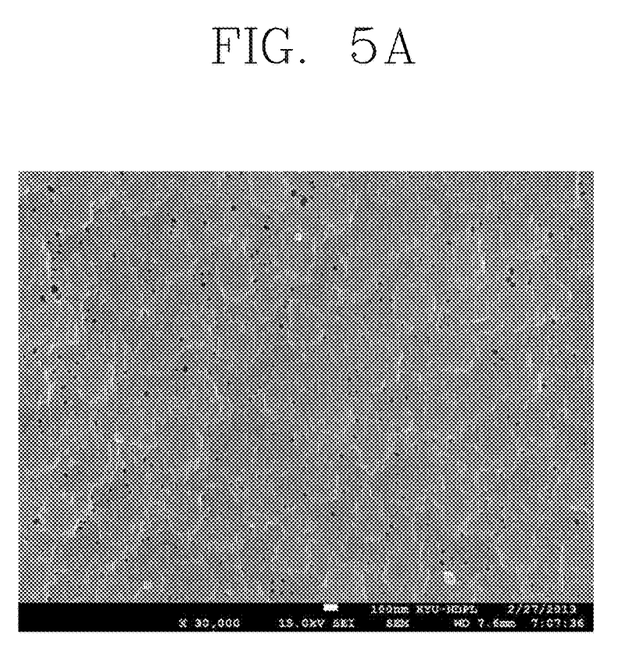
FIGS. 5a and 5b are a scanning electron microscope photograph which compares the membranes according to the present invention before and after being surface-modified.
Figure 5B:
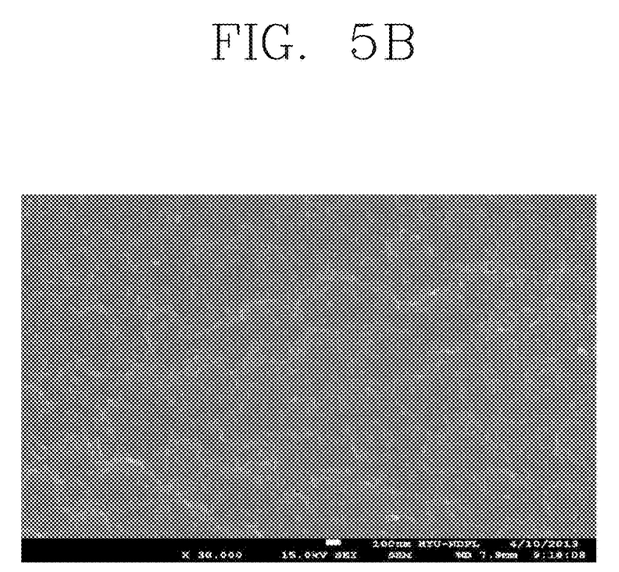

FIGS. 5a and 5b are a scanning electron microscope photograph which compares the membranes according to the present invention before and after being surface-modified.

FIG. 5a is a photograph of the membrane before being surface-modified, and FIG. 5b is a photograph of the membrane after being surface-modified. When FIGS. 5a and 5b are compared with each other, it can be confirmed that there is no significant change on the surface of the membrane. Through this, it can be inferred that the coating layer formed on the membrane has been formed on the nanoscale, and a decrease in permeation flow rate of the membrane before and after the coating is also very limiting.

Hereinafter, specific exemplary embodiments of the method of modifying the surface of the membrane described in FIG. 4 will be described in comparison with the Comparative Example, and the effects of the present invention will be described with reference to FIGS. 6a to 9b.

EXAMPLES

The materials and concentrations required for the reaction in the present Example are each shown in Table 2.

TABLE 2

| Material | Concentration |
| --- | --- |
| pH-Adjusted Buffer Solution (Trizma hydrochloride, Tris-HCl) | 15 mmol/L |
| Dopamine (hydrochloride, Dopa-HCl) | 1 mg/mL |
| Hydrophilic material (poly(ethylene glycol) diacrylate (PEGDA)) | 1 mg/mL |
| Initiator (Potassium persulfate (KPS)) | 0.1 mg/mL |

First, a mixed solution of a tris-buffer solution for being introduced into a reactor and a hydrophilic material is prepared.

15 mM of Tris-HCl is added to ultra-pure water and the resulting mixture is sufficiently mixed. When the tris-HCl is completely dissolved, an NaOH solution is added thereto to adjust the pH to pH 8.5 in which dopamine is reacted, thereby preparing a tris-buffer solution. Poly ethylene glycol (PEG) is added to the tris-buffer solution prepared, and the resulting mixture was stirred for 24 hours or more to prepare a mixed solution.

Next, the membrane of which the surface is to be modified is fixed on the bottom of the reactor, and then, the mixed solution previously prepared is added thereto. The temperature in the reactor is adjusted to 65° C. or more, and an initiator KPS and dopamine Dopa-HCl were simultaneously added thereto.

It is possible to prepare a surface-modified membrane to be implemented in the present invention by carrying out thermal crosslinking for 30 minutes while injecting ultra high pure oxygen into the reactor at a rate of 0.5 L/min, and performing washing with ultra-pure water for 1 hour or more after the reaction is completed.

Comparative Example

In the Comparative Example, a coating layer is formed by only an oxidation reaction without mixing a hydrophilic solution. The materials and concentrations required for the reaction in the present Comparative Example are each shown in Table 3.

TABLE 3

| Material | Concentration |
| --- | --- |
| pH-Adjusted Buffer Solution (Trizma hydrochloride, Tris-HCl) | 15 mmol/L |
| Dopamine (hydrochloride, Dopa-HCl) | 2 mg/mL |

First, the tris-buffer solution is prepared, but the hydrophilic solution is not mixed unlike in the Example previously explained. For the tris-buffer, 15 mM of tris-HCl is added to ultra-pure water and the mixture is sufficiently mixed. The pH is adjusted to 8.5 by completely dissolving tris-HCl, and then adding the NaOH solution thereto.

Subsequently, the membrane is fixed on the bottom of the reactor, and then the tris-buffer solution is added thereto. Moreover, dopamine is added, the oxidation reaction is carried out for 30 minutes while injecting ultra high pure oxygen into the reactor at a rate of 1 L/min, and then the membrane is washed with ultra-pure water for 1 hour or more.

Hereinafter, the surface-modified membrane previously explained and the effects of the method of modifying the surface of the membrane will be described with reference to the drawings.

Figure 6A:
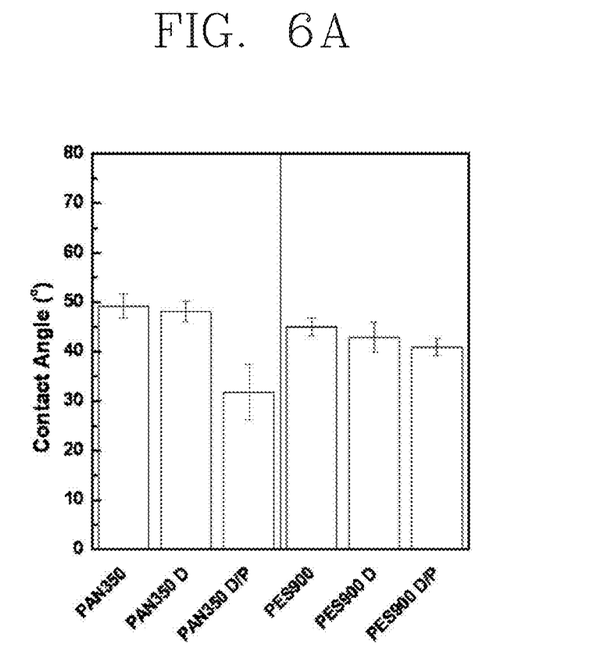
FIGS. 6a and 6b are a comparative graph for explaining the hydrophilicity of the surface-modified membrane.
Figure 6B:
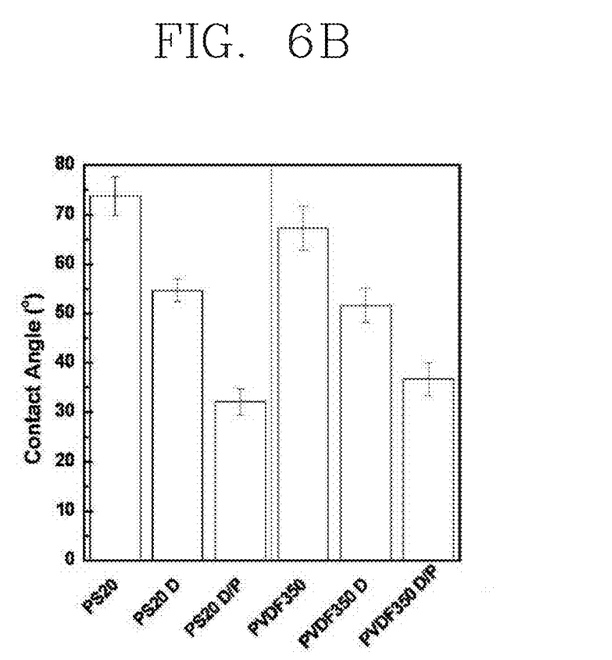

FIGS. 6a and 6b are a comparative graph for explaining the hydrophilicity of the surface-modified membrane.

The water contact angle indicates an angle between a water drop and the surface, and means that the lower the value is, the more hydrophilic the surface of the support is.

The graph illustrated in FIG. 6a compares the case where polyacrylonitrile (PAN350) and polyethersulfone (PES900) are not each surface-modified (PAN350 and PES900), the case where PAN350 and PES900 are surface-modified with only dopamine (PAN350 D and PES900 D), and the case where PAN350 and PES900 are surface-modified by mixing dopamine with a hydrophilic material (PAN350 D/P and PES900 D/P).

It can be confirmed that the membrane modified with dopamine is more hydrophilic than the case where the surface of the membrane is modified, and the membrane obtained by mixing dopamine with the hydrophilic material and modifying the surface is more hydrophilic than the case where the surface of the membrane is modified with only dopamine.

The graph illustrated in FIG. 6b compares the case where polysulfone (PS20) and polyvinyldifluoride (PVDF350) are not each surface-modified (PS20 and PVDF350), the case where PS20 and PVDF350 are surface-modified with only dopamine (PS20 D and PVDF350 D), and the case where PS20 and PVD350 are surface-modified by mixing dopamine with a hydrophilic material (PS20 D/P and PVDF350 D/P).

Even in FIG. 6b, it can be confirmed likewise as in FIG. 6a that the membrane modified with dopamine is more hydrophilic than the case where the surface of the membrane is modified, and the membrane obtained by mixing dopamine with the hydrophilic material and modifying the surface is more hydrophilic than the case where the surface of the membrane is modified with only dopamine.

Since the fact that the surface-modified membrane indicates hydrophilicity means that the membrane may be protected from hydrophobic fouling materials, it can be confirmed from FIGS. 6a and 6b that the present invention may improve fouling resistance of the membrane by a coating layer.

FIGS. 7a to 9b are a comparative graph for explaining the effects of modifying the surface of the membrane.

Figure 7A:
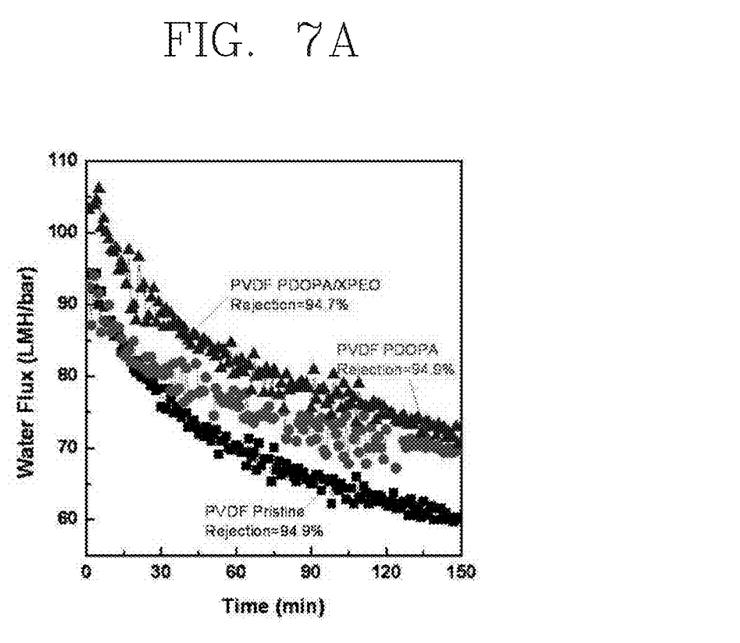
Figure 7B:
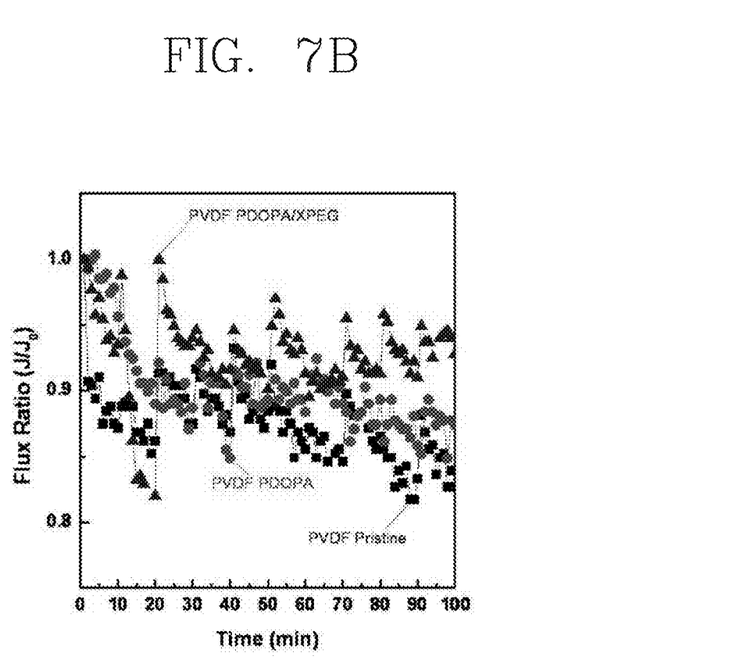

FIGS. 7a and 7b compare the case where polyvinyldifluoride (PVDF) is not surface-modified (PVDF Pristine), the case where polyvinyldifluoride (PVDF) is surface-modified with only dopamine (PVDF PDOPA), and the case where polyvinyldifluoride (PVDF) is surface-modified by mixing dopamine with a hydrophilic material (PVDF PDOPA/XPEO), FIG. 7a compares the changes in water flux of the membrane over the time of operation, and FIG. 7b sets the water flux of the membrane at the time (0 min) of initiating the chemical cleaning (NaOCl) as a reference value of 1.0 and compares the flux ratios over time.

Figure 8A:
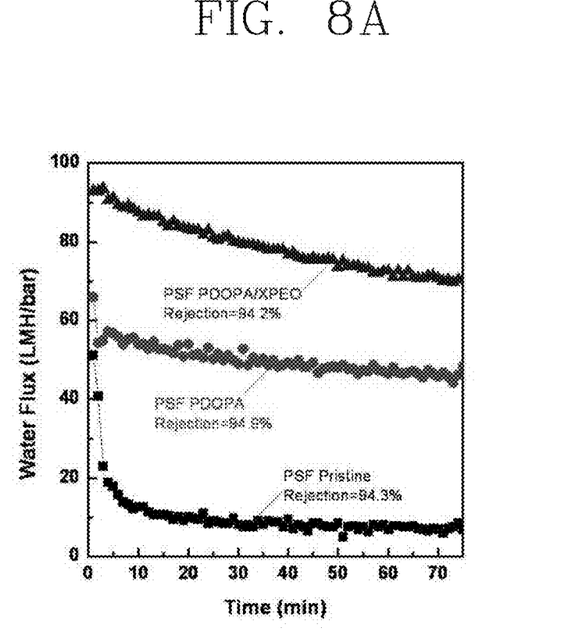
Figure 8B:
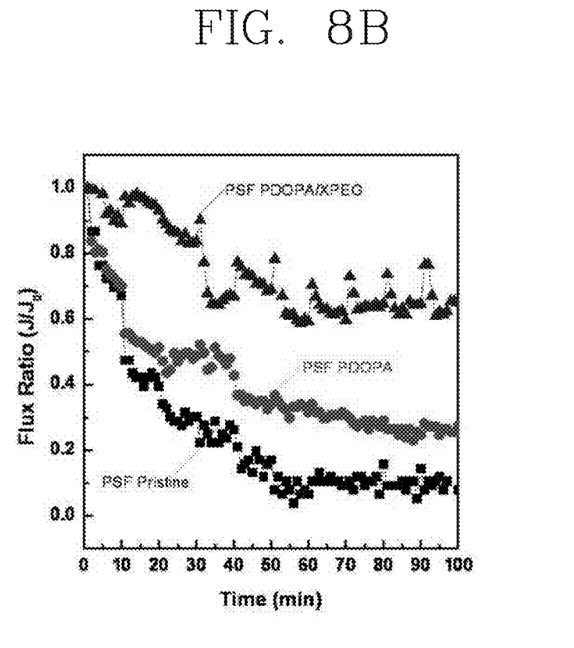

FIGS. 8a and 8b compare the case where polysulfone (PSF) is not surface-modified (PSF Pristine), the case where polysulfone (PSF) is surface-modified with only dopamine (PSF PDOPA), and the case where polysulfone (PSF) is surface-modified by mixing dopamine with a hydrophilic material (PSF PDOPA/XPEO), FIG. 8a compares the changes in water flux of the membrane over the time of operation, and FIG. 8b sets the water flux of the membrane at the time (0 min) of initiating the chemical cleaning (NaOCl) as a reference value of 1.0 and compares the flux ratios.

Figure 9A:
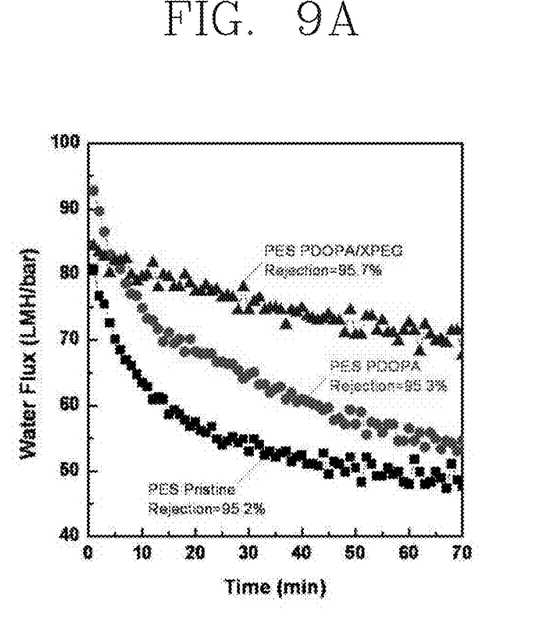
Figure 9B:
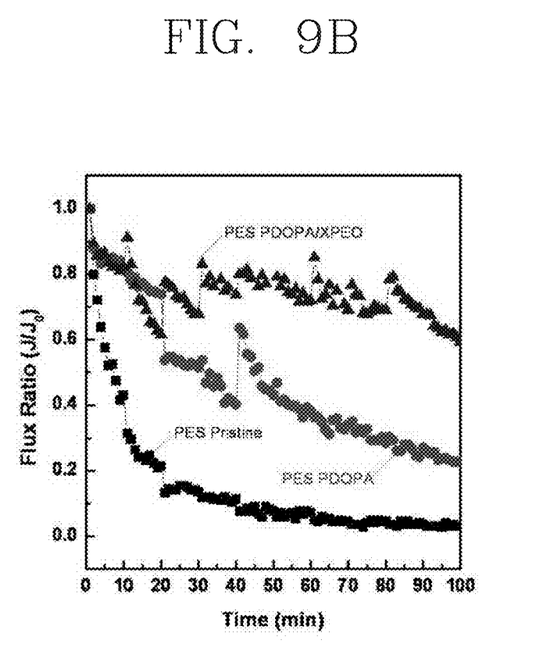

FIGS. 9a and 9b compare the case where polyethersulfone (PES) is not surface-modified (PES Pristine), the case where polyethersulfone (PES) is surface-modified with only dopamine (PES PDOPA), and the case where polyethersulfone (PES) is surface-modified by mixing dopamine with a hydrophilic material (PES PDOPA/XPEO), FIG. 9a compares the changes in water flux of the membrane over the time of operation, and FIG. 9b sets the water flux of the membrane at the time (0 h) of initiating the chemical cleaning (NaOCl) as a reference value of 1.0 and compares the flux ratios.

Referring to FIGS. 7a, 8a, and 9a, it can be confirmed that the surface-modified membrane according to the present invention has a minimal change in rejection when the case where the surface is not modified is compared with the case where the surface is coated with only dopamine, and thus, the coating layer is formed on the nanoscale in which the pores of the membrane are not clogged, and that a decrease in water flux over time is also limiting, and thus, fouling resistance is improved.

Further, referring to FIGS. 7b, 8b, and 9b, it can be confirmed that the surface-modified membrane according to the present invention has the smallest change in water permeation rate of the coating layer before and after the chemical cleaning when the case where the surface is modified is compared with the case where the surface is coated with only dopamine, and thus, chemical resistance and fouling resistance are improved, and the structural stability of the coating layer is improved.

The surface-modified membrane and the method of modifying the surface of the membrane as described above are not limited by the configurations and methods of the exemplary embodiments as described above, but the exemplary embodiments may also be configured by selectively combining a whole or part of the exemplary embodiments, such that various modifications can be made.

The present invention may be used in various industrial fields which are associated with a membrane for water treatment.

The invention claimed is:

1. A surface-modified membrane comprising: a membrane; and
    a coating layer formed on a surface of the membrane in order to improve fouling resistance and chemical resistance of the membrane,
    wherein the coating layer comprises
        dopamine which implements the thickness of the coating layer on the nanoscale in order to suppress the permeation flow rate of the membrane from being decreased before and after the coating layer is coated and provides the coating layer with adhesion by which the coating layer is stably bonded to the membrane, and
        a hydrophilic material which is bonded to the dopamine through a secondary bond including a hydrogen bond, or a cross-linked bond in order to suppress durability of the coating layer from deteriorating, and imparts hydrophilicity to the surface of the membrane in order to protect the membrane from hydrophobic fouling materials,
    wherein the dopamine and the hydrophilic material are randomly mixed together to form a single layer, and the coating layer has a thickness of 0.1 to 50 nm.

2. The surface-modified membrane of claim 1, wherein the hydrophilic material, which is bonded to the dopamine through the cross-linked bond, is a poly ethylene glycol (PEG)-based material selected from a group consisting of poly(ethylene glycol) methyl ether acrylate (PEGMEA), poly(ethylene glycol) acrylate (PEGA), poly(ethylene glycol) dimethacrylate (PEGDMA) and tetra(ethylene glycol) dimethacrylate (TEGDM).

3. The surface-modified membrane of claim 1, wherein the hydrophilic material, which is bonded to the dopamine through the secondary bond comprising a hydrogen bond, is a water-soluble molecule having an amphoteric hydrogen donor or hydrogen acceptor.

4. The surface-modified membrane of claim 1, wherein the hydrophilic material, which is bonded to the dopamine through the secondary bond including a hydrogen bond, is a hydrophilic polymer or a catecholamine-based water-soluble material.

5. The surface-modified membrane of claim 1, wherein the hydrophilic material, which is bonded to the dopamine through the secondary bond comprising a hydrogen bond, is a poly(2-methacryloyloxyethyl phosphorylcholine) (MPC) polymer or an amphiphilic copolymer having both hydrophilicity and oleophilicity.

6. A method of modifying the surface of a membrane, the method comprising:
    introducing a membrane of which the surface is to be modified into a reactor;
    adding a mixed solution formed by adding a hydrophilic material to a tris-buffer solution adjusted to a pH range in which dopamine is reacted and stirring the resulting mixture to the reactor;
    adding dopamine and an initiator which induces a cross-linked bond between the hydrophilic material and the dopamine to the reactor in a predetermined temperature range; and
    forming a coating layer in which the dopamine and the hydrophilic material are mixed on the membrane through thermal crosslinking in the predetermined temperature range while injecting oxygen into the reactor.

7. The method of claim 6, wherein the initiator is at least one selected from the group consisting of lauroyl peroxide, ammonium persulfate, potassium persulfate, and azobisisobutyronitrile (AIBN).

8. The method of claim 6, wherein the pH range in which the dopamine is reacted is pH 8 to pH 9, and
    the predetermined temperature range is 60 to 80° C.

* * * * *

UNITED STATES PATENT AND TRADEMARK OFFICE
CERTIFICATE OF CORRECTION

PATENT NO.          : 10,207,228 B2                Page 1 of 1
APPLICATION NO.     : 14/911415
DATED               : February 19, 2019
INVENTOR(S)         : Changho Lee et al.

It is certified that error appears in the above-identified patent and that said Letters Patent is hereby corrected as shown below:

On the Title Page (73) Assignee should read:
LG CHEM, LTD., Seoul (KR);
INDUSTRY-UNIVERSITY COOPERATION FOUNDATION HANYANG UNIVERSITY, Seoul (KR)

Signed and Sealed this
Twelfth Day of November, 2019

Andrei Iancu
*Director of the United States Patent and Trademark Office*